United States Patent
Hung (10) Patent No.: US 9,354,655 B2
(45) Date of Patent: May 31, 2016

(54) STEPLESS ROTATING KNOB MODULE AND ELECTRONIC DEVICE HAVING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventor: Yi-Chun Hung, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 341 days.

(21) Appl. No.: 13/869,615

(22) Filed: Apr. 24, 2013

(65) Prior Publication Data

US 2014/0165774 A1 Jun. 19, 2014

(30) Foreign Application Priority Data

Dec. 14, 2012 (TW) .............................. 101147552 A (51) Int. Cl.
*G05G 1/12* (2006.01)
*B60K 37/06* (2006.01)
*H01H 19/00* (2006.01)

(52) U.S. Cl.
CPC *G05G 1/12* (2013.01); *B60K 37/06* (2013.01); *H01H 19/001* (2013.01); *Y10T 74/2084* (2015.01)

(58) Field of Classification Search
CPC . Y10T 74/2084; Y10T 16/508; Y10T 16/506; Y10T 16/487; G05G 1/10; G05G 1/12; G05G 1/08; G05G 1/087; B60K 37/06; H01H 19/001; H01H 19/14; H01H 19/165; H01H 3/08; H01H 3/10; H01H 3/60; H01H 2003/105; G01G 2019/146
USPC ........... 74/10.22, 10 R, 10.1; 200/11 R, 11 C, 200/11 TW, 336
See application file for complete search history.

(56) References Cited

U.S. PATENT DOCUMENTS

| | | | | |
|---|---|---|---|---|
| 2,853,564 A | * | 9/1958 | Gahagan | 200/11 D |
| 3,566,049 A | * | 2/1971 | Wright | 200/14 |
| 3,598,933 A | * | 8/1971 | Walser | 200/11 TW |
| 3,697,922 A | * | 10/1972 | Hammond | 338/163 |

(Continued)

FOREIGN PATENT DOCUMENTS

TW 337392 7/1998

*Primary Examiner* — Daniel Yabut
(74) *Attorney, Agent, or Firm* — Li & Cai Intellectual Property (USA) Office (57) ABSTRACT

A stepless rotating knob module includes a supporting frame, a rotating disk, a suspending assembly, an encoding switch and a transferring element. The support frame has a front wall, a top wall and a bottom wall. The front wall is formed with a through hole. The rotating disk is disposed between the top wall and the bottom wall and is partially exposed outside the through hole. The suspending assembly passes through the rotating disk and is fixed to the bottom wall, so that the rotating disk is rotatably mounted on the suspending screw. The encoding switch is fixed to the bottom wall of the supporting frame and has a rotating rod. The transferring element is fixedly disposed on the bottom of the rotating disk fixed to the bottom of the transferring element. The present disclosure also provides an electronic device having stepless rotating knob module.

12 Claims, 8 Drawing Sheets

(56) References Cited

U.S. PATENT DOCUMENTS

| | | | |
|---|---|---|---|
| 3,809,830 A * | 5/1974 | Lockard et al. | 200/11 TW |
| 4,034,178 A * | 7/1977 | Koppenheffer et al. | 200/293 |
| 4,131,771 A * | 12/1978 | Erickson et al. | 200/11 DA |
| 4,300,114 A * | 11/1981 | Sheridan et al. | 338/172 |
| 5,847,346 A * | 12/1998 | Hoskins et al. | 200/296 |
| 6,198,055 B1 * | 3/2001 | Hughes | 200/14 |
| 6,339,200 B1 * | 1/2002 | Shi et al. | 200/305 |
| 2009/0078551 A1 * | 3/2009 | Kang | 200/336 |
| 2012/0218233 A1 * | 8/2012 | Chun et al. | 345/184 |

\* cited by examiner

STEPLESS ROTATING KNOB MODULE AND ELECTRONIC DEVICE HAVING THE SAME

BACKGROUND OF THE INVENTION

1. Field of the Invention

The present disclosure is related to a stepless rotating knob module and an electronic device having the same. In particular, the present disclosure relates to a rotating knob module for adjusting an output volume by rotating, and an electronic device having stepless rotating knob module.

2. Description of Related Art

Rotating knob is widely applied to electronic devices for adjusting volume. A conventional rotating knob, such as Taiwan R.O.C. Patent issued number TW 337392 "ASSISTANT POSITIONING DEVICE FOR VOLUME ADJUSTING KNOB OF MONITOR EXTERNAL SPEAKER" includes a volume knob and a variable resistor with a rotating rod. The volume knob has a linking post extended from a bottom center thereof for connecting to the rotating rod of the variable resistor. When user rotates the volume knob, the rotating rod is rotated simultaneously to adjust the outputting resistance.

However, the above-mentioned structure could not fulfill the current tendency design. For example, during rotating, the volume adjusting knob is not so smoothly because of the friction of the variable resistor, and has "step feeling". Besides, the variable resistor may be failed after using for a long period time because of poor contact.

Therefore, it is the industry design tendency that how to reduce the rotation friction of volume adjusting knob. Besides, the total thickness of the adjusting knob should be considered to match with the electronic device, such as a miniature audio device. Further, it also needs to consider that how to avoid transmitting the frictional condition from the variable resistor to the volume adjusting knob.

Therefore, it is desirable to propose a rotating knob module to overcome the above-mentioned problems.

SUMMARY OF THE INVENTION

The present disclosure provides a stepless rotating knob module, which can achieve a rotation controlling with stepless operating feeling. The rotating knob module not only has smooth rotation, but also controls the outputting value.

Further, the present disclosure provides a stepless rotating knob module, having a small dimension to reduce the occupied space in an electronic device, and being able to change its position according to the appearance design of the electronic device.

In order to achieve the above objectives, the present disclosure is to provide a stepless rotating knob module, includes a supporting frame, a rotating disk, a suspending assembly, an encoding switch and a transferring element. The supporting frame has a front wall, a top wall, and a bottom wall. The top wall and the bottom wall are extending from a top edge and a bottom edge of the front wall respectively. The front wall is formed with a front opening The rotating disk is disposed between the top wall and the bottom wall and is partially exposed outside the front opening. The suspending assembly upwardly passes through the rotating disk from a bottom surface of the rotating disk, and is fixed to the top wall. The rotating disk is rotatably disposed on the suspending assembly. The encoding switch is fixedly connected to the bottom wall of the supporting frame, and has a rotating rod toward the top wall. The transferring element is fixedly mounted on the center of the bottom surface of the rotating disk. The rotating rod of the encoding switch is fixed to a bottom surface of the transferring element.

Moreover, the present disclosure provides an electronic device having stepless rotating knob module, equipped with a rotating knob module of lower height and small size, being beneficial to miniaturize electronic device. The position can be arranged according to the demand of appearance design.

In order to achieve the above objectives, the present disclosure is to provide an electronic device having stepless rotating knob module, includes an operating panel and a stepless rotating knob module. The operating panel is formed with a panel opening The stepless rotating knob module has a supporting frame fixed at an inner side of the operating panel, a rotating disk, a suspending assembly, an encoding switch and a transferring element. The supporting frame has a front wall, a top wall, and a bottom wall. The top wall and the bottom wall are extending from a top edge and a bottom edge of the front wall respectively. The front wall is formed with a front opening. The rotating disk is disposed between the top wall and the bottom wall, and a part thereof passes the front opening of the supporting frame and the panel opening of the operating panel, exposed outside the operating panel. The suspending assembly passes through the rotating disk from the bottom surface of the rotating disk, and is fixed to the top wall. The rotating disk is rotatably disposed on the suspending assembly. The encoding switch is fixedly connected to the bottom wall of the supporting frame, and has a rotating rod extended toward the top wall. The transferring element is fixedly disposed on the center of the bottom surface of the rotating disk. The rotating rod of the encoding switch is fixed to the bottom surface of the transferring element.

Thus, the present disclosure has advantages as followed. The present disclosure provides a structure benefited to a slim design of electronic devices, and is able to change the disposition according to the appearance requirements of design. Further, the present disclosure utilizes the suspending assembly passing through the bottom of the rotating disk and fixed to the top wall, so that the rotating disk can be rotated in a suspending manner by the suspending assembly. Therefore, the rotating disk can smoothly rotate in the supporting frame. Moreover, the transferring element is disposed under the rotating disk of the instant embodiment and connected to the encoding switch. The transferring element can absorb any uneven rotation of the encoding switch, so that the rotating disk can rotate smoothly.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE PREFERRED EMBODIMENTS

Figure 1:
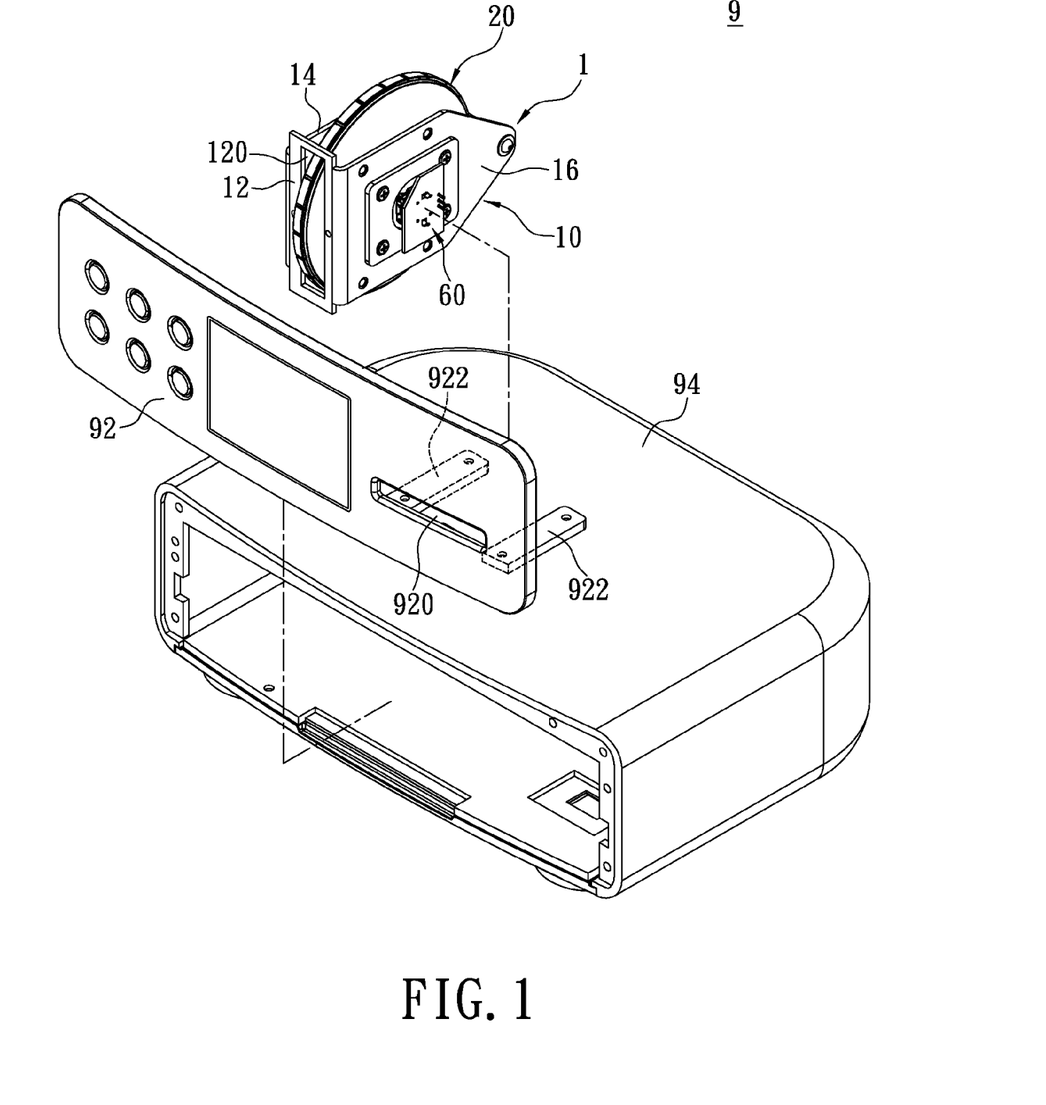
FIG. 1 is an exploded perspective view of an electronic device having stepless rotating knob module according to the present disclosure.

Please refer to FIG. 1, which shown an exploded perspective view of electronic device having stepless rotating knob module according to the present disclosure. The present disclosure provides an electronic device 9 with a stepless rotating knob module, including an operating panel 92, a housing 94, and a stepless rotating knob module 1 mounted to the operating panel 92. The operating panel 92 is fixed to the housing 94. The stepless rotating knob module 1 is partially exposed outside the operating panel 92 for operating by user. In this instant embodiment, the electronic device 9 is illustrated as an audio equipment, but it is not limited thereto. The present disclosure can be applied to any electronic device with rotating knob, such as volume adjustment knob of audio equipment, frequency adjustment knob, temperature adjustment knob, and corresponding control knobs of medical equipment . . . etc.

The operating panel 92 of the instant embodiment has a panel opening 920, and a pair of suspending arms 922 fixed to an inner side thereof and closed to the panel opening 920. The bottom of the stepless rotating knob module 1 is fixed to the pair of suspending arms 922. However, the way to fix stepless rotating knob module 1 of the present disclosure is not limited thereto. For example, the stepless rotating knob module 1 can be fixed to the operating panel 92 via the front end or a top end thereof.

Figure 2:
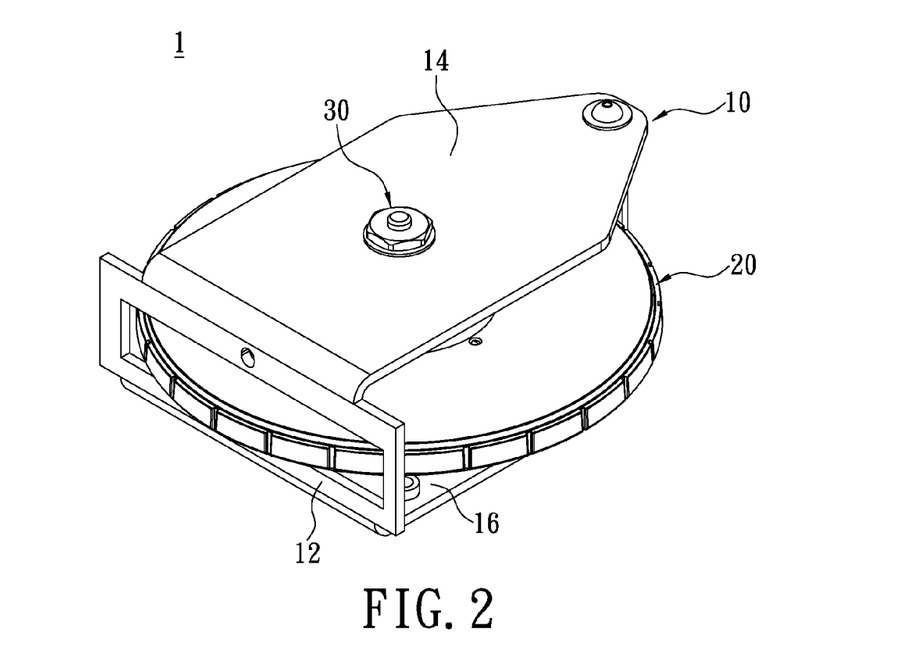
FIG. 2 is a perspective assembled view of the stepless rotating knob module according to the present disclosure.
Figure 3:
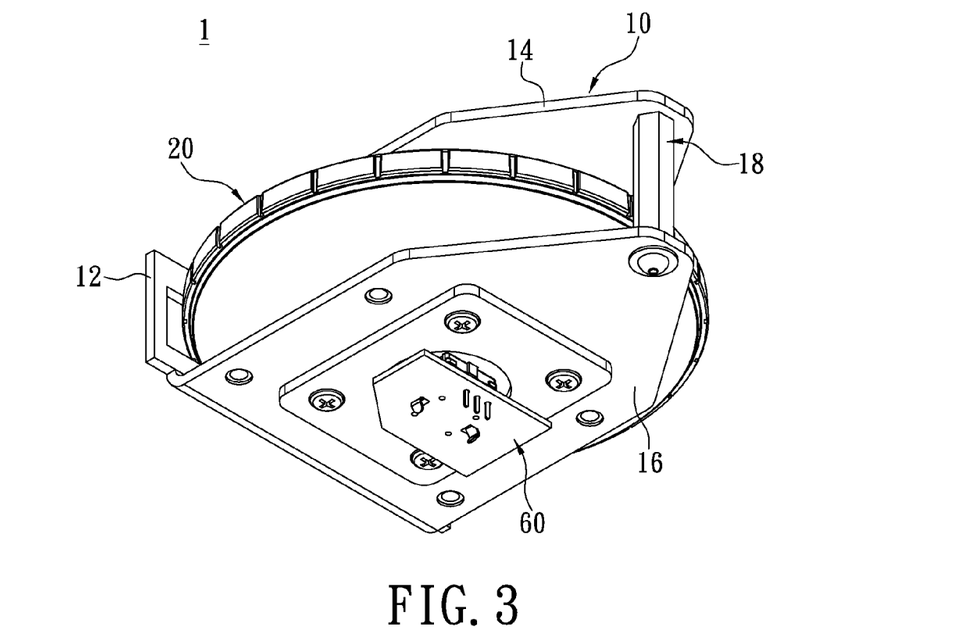
FIG. 3 is another perspective assembled view of the stepless rotating knob module according to the present disclosure.

Please refer to FIG. 2 and FIG. 3, which are different assembled perspective views of the stepless rotating knob module of the present disclosure. The stepless rotating knob module 1 of the present disclosure, or called as rotating knob module 1, includes a supporting frame 10 of substantial U-shaped, a rotating disk 20 is mounted to the supporting frame 10 in a suspending way, and an encoding switch 60 disposed at a bottom of the supporting frame 10 and driven by the rotating disk 20 to produce output signals. The supporting frame 10 is fixed to the inner side of the operating panel 92. The supporting frame 10 has a front wall 12, a top wall 14, and a bottom wall 16. The top wall 14 and the bottom wall 16 are extended from a top and bottom edges of the front wall 12 respectively.

Please refer to FIG. 1 to FIG. 3. The front wall 12 is formed with a front opening 120. The rotating disk 20 is partially passed outside the front opening 120 and the panel opening 920 of the operating panel 92, so that it is partially exposed outside the operating panel 92. The bottom wall 16 of the supporting frame 10 is fixedly screwed to the pair of suspending arms 922, so that the stepless rotating knob module 1 is fixed to the operating panel 92. Besides, the front wall 12 can be screwed to the inner side of the operating panel 92. Alternatively, the suspending arms can be fixed to a top surface of the stepless rotating knob module 1.

The present disclosure utilizes a suspending means to connect rotating disk 20 with the top wall 14 of the supporting frame 10. The rotation of rotating disk 20 is not conflicted or contacted with bottom wall 16, so that there is no any friction, and amount resistance is reduced during rotating. The rotating disk 20 therefore can rotate smoothly, and provides a rotating adjustment with stepless feeling. The suspending means for smooth rotation will be described in detail hereafter.

Figure 4:
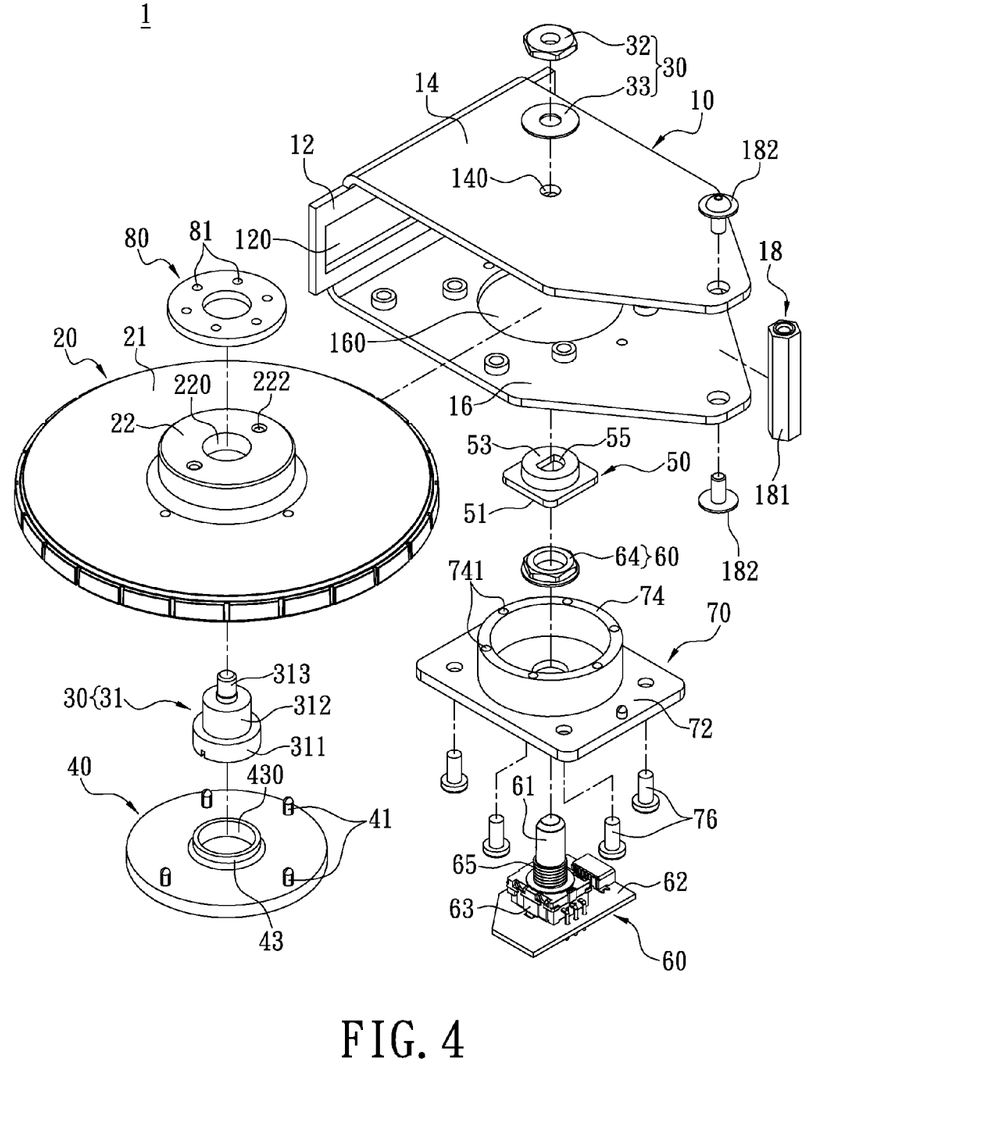
FIG. 4 is an exploded perspective view of the stepless rotating knob module according to the present disclosure.
Figure 5:
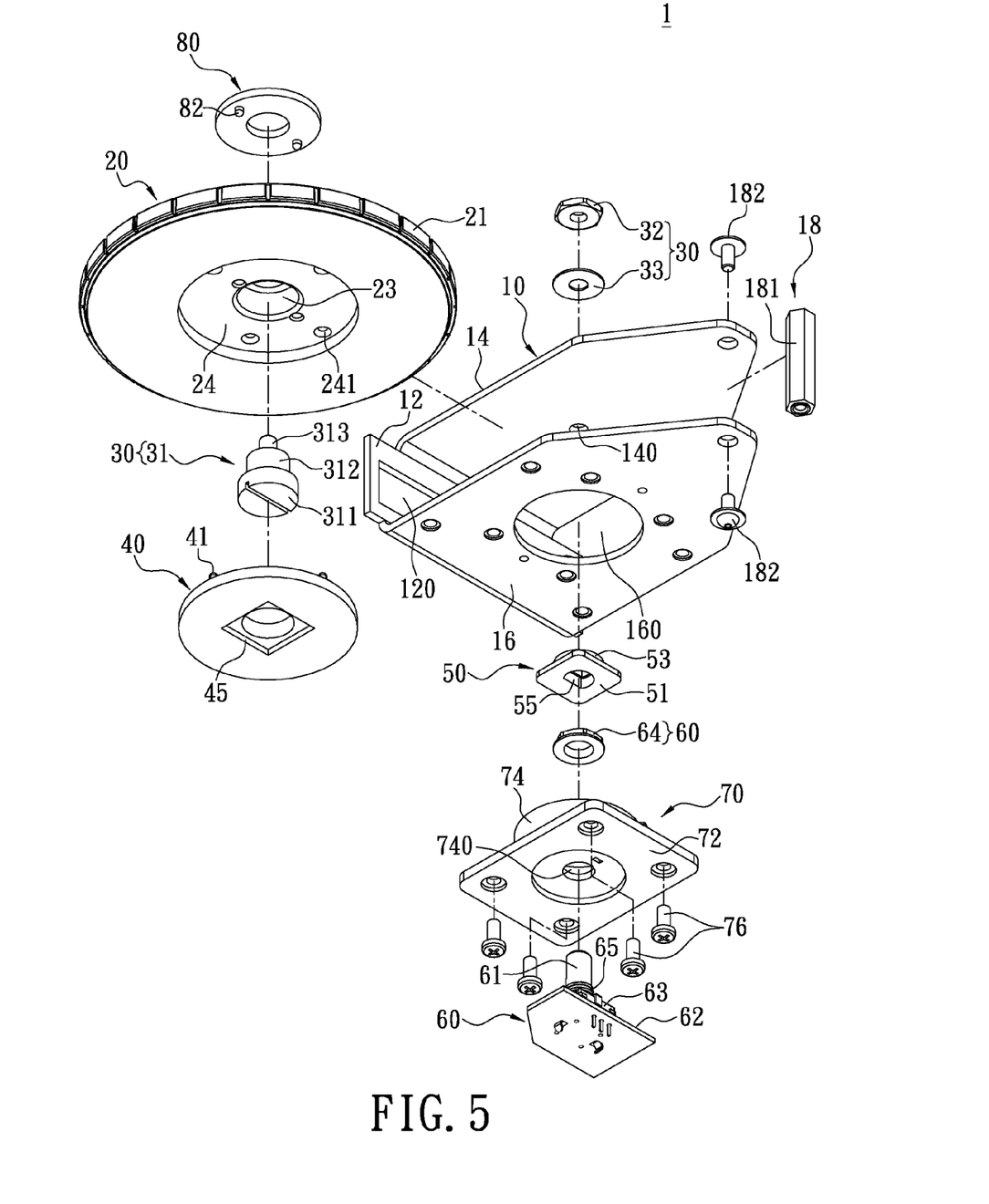
FIG. 5 is another exploded perspective view of the stepless rotating knob module according to the present disclosure.

Please refer to FIG. 4 and FIG. 5, which are exploded views of the stepless rotating knob module of present disclosure. Concerning the suspending means of the present disclosure, the rotating knob module 1 has a suspending assembly 30. The suspending assembly 30 passes upward through the rotating disk 20 from the bottom surface of the rotating disk 20, and is fixed to the top wall 14. The rotating disk 20 is rotatably mounted on the suspending assembly 30.

The suspending assembly 30 includes a multi-sectional suspending screw 31, a screw nut 32 disposed on the top wall 14, and a washer 33. The suspending screw 31 has a head portion 311, a shaft portion 312 and a screwing portion 313. Each of the head portion 311 and the shaft portion 312 has smooth peripheral surface. The diameter of the head portion 311 is larger than that of the shaft portion 312.

Figure 6:
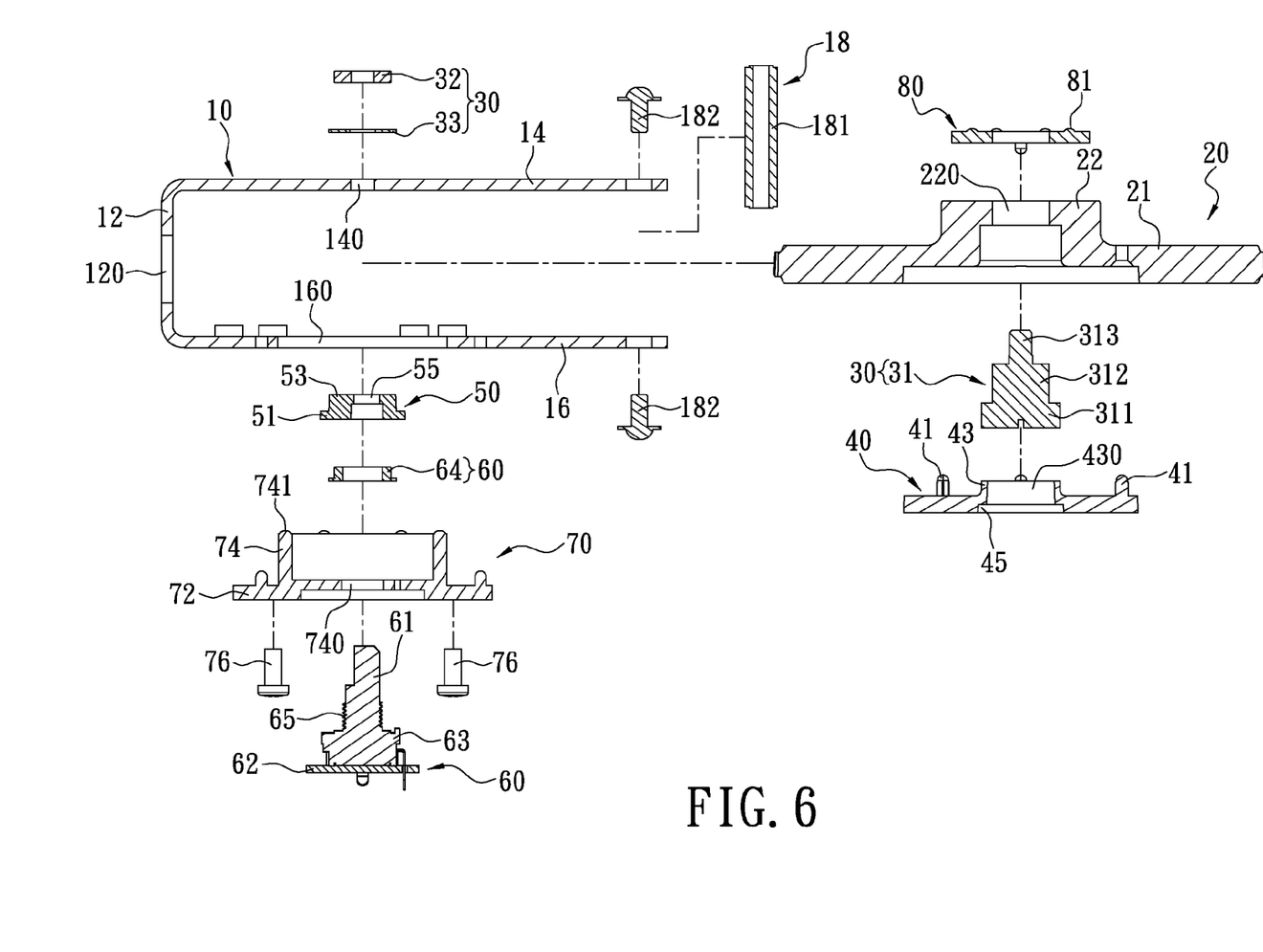
FIG. 6 is an exploded cross-sectional view of the stepless rotating knob module according to the present disclosure.

Please refer to FIG. 4 and FIG. 6. FIG. 6 is a cross-sectional view of the stepless rotating knob module of the present disclosure. Please note that if the elements mentioned in the following describing refer to FIGS. 6 to 8 of this instant embodiment have no labeled number, those can be corresponded to the element numbers in FIG. 1 to FIG. 5, for clearly presenting the corresponding positions of those relative elements in the perspective or plan views. To cooperate with the suspending assembly 30, the rotating disk 20 has a disk body 21, a sleeve portion 22 protruded from a center of the disk body 21, and a blocking groove 23 formed on a bottom thereof. An axial hole 220 formed through the sleeve portion 22. The blocking groove 23 is communicated with the axial hole 220 (as shown in FIG. 5). The diameter of blocking groove 23 is larger than that of the axial hole 220.

As shown in FIG. 6, after the instant embodiment is assembled, the shaft portion 312 of the suspending screw 31 is smoothly disposed the axial hole 220, and the head portion 311 is disposed in the blocking groove 23. The rotating disk 20 therefore is suspended on the head portion 311 and can be rotated around the shaft portion 312. Besides, the shaft portion 312 is exposed outside a top surface of the rotating disk 20 and contacts the bottom surface of the top wall 14. The diameter of the shaft portion 312 is larger than that of the screwing portion 313. The screwing portion 313 is protruded outside the rotating disk 20 and passes through the top hole 140 of the top wall 14 to screw with the screw nut 32. In other words, the suspending screw 31 is screwed and fixed to the top wall 14, and the rotating disk 20 is rotatably put on suspending screw 31.

Figure 7:
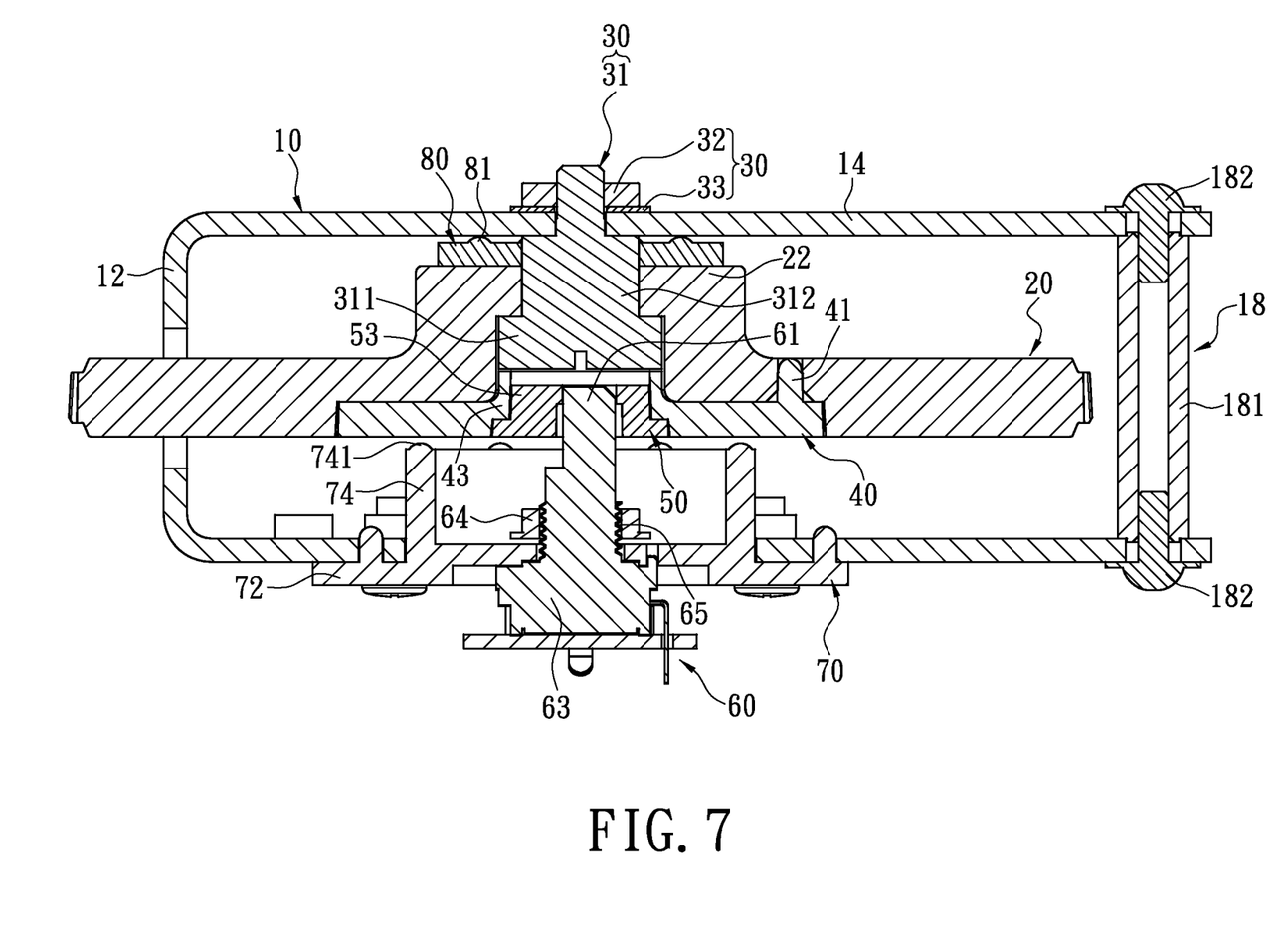
FIG. 7 is an assembled cross-sectional view of the stepless rotating knob module according to the present disclosure.

Please refer to FIG. 7, which is a cross-sectional assembled view of the stepless rotating knob module of the present disclosure. From the view of cross-section, the total height of the supporting frame 10 is substantially equal to that of the rotating disk 20 plus the height of the suspending screw 31 and the rotating rod 61. In an alternative view, the total height of the supporting frame 10 is substantially equal three-fold high of the rotating disk 20. Comparing the prior art, the stepless rotating knob module of the present disclosure does not need the various structure design of axial joints, and has a lower height and a small occupied space. The present disclosure is benefited for the slim development of electronic devices, and can change the position conveniently according to the demand of industrial design.

Please refer to FIG. 4. The encoding switch 60 is fixedly connected to the bottom wall 16 of the supporting frame 10, which has a circuit board 62, a rotary encoder 63 disposed on the circuit board 62, a rotating rod 61 extended toward the top wall 14 and perpendicularly connected the rotary encoder 63. The rotary encoder 63, also called a shaft encoder, is an electro-mechanical device that converts the angular position or motion of a shaft or axle to an analog or digital code, thus increasing or decreasing a signal. The encoding switch 60 can be applied to volume adjustment of audio device, frequency adjustment, temperature adjustment, and light adjustment . . . etc.

To make the rotating disk 20 rotating more smoothly in this embodiment, as shown in FIG. 4 and FIG. 5, the rotating knob module 1 further includes a holding piece 40 and a transferring element 50. For matching with the holding piece 40, the rotating disk 20 has a bottom depression 24, which is formed concavely from a bottom thereof and communicated with the blocking groove 23. The holding piece 40 is wedged in the bottom depression 24. The transferring element 50 is held by the holding piece 40 to the center of the bottom surface of the rotating disk 20. The rotating rod 61 of the encoding switch 60 is fixed wedged in the transferring element 50. In other words, the rotating disk 20 of this embodiment is not directly pressed on the encoding switch 60, so that it will not affected by the precision and stableness of the encoding switch 60.

Please refer to FIG. 4 and FIG. 5. In this embodiment, the holding piece 40 is shaped in disk-plate, and the bottom depression 24 of the rotating disk 20 is correspondingly shaped in a concaved circular indention. The holding piece 40 is formed a hollow protruding ring 43 on a top surface thereof, and a plurality of engaging posts 41 formed around the protruding ring 43. A central portion of the protruding ring 43 is formed with a ring hole 430. As shown in FIG. 5, the rotating disk 20 has a plurality of wedging holes 241 concaved upward from the bottom depression 24. The engaging post 41 are inserted and fixed in the wedging holes 241 respectively. The protruding ring 43 is wedged in the blocking groove 23, and propped against the suspending screw 31.

The bottom of the holding piece 40 has a transferring recess 45 which has a contour corresponded to that of the transferring element 50. In this embodiment, the transferring recess 45 is square, but it is not limited thereto. The transferring element 50 has a bottom portion 51 of square-shaped, and a matching portion 53 extended from the bottom portion 51 upward. The matching portion 53 is formed with a matching hole 55, which has a contour matching with the rotating rod 61 of encoding switch 60 and is substantially semicircular-shaped. The bottom portion 51 of the transferring element 50 is wedged in the transferring recess 45, and the matching portion 53 is wedged in the ring hole 430 of the protruding ring 43.

The present disclosure arranges the rotating disk 20 to be suspended to the top wall 14 of the supporting frame 10, so that the rotating disk 20 is independent from the encoding switch 60. Since it cannot avoid the friction or step feeling when the encoding switch 60 is rotating, through the holding piece 40 and transferring element 50, the rotation vibration of the encoding switch 60 is not directly transmitted to the rotating disk 20. Therefore, the rotating feeling of the rotating disk 20 is avoided from being affected. The transferring element 50 preferably is made of flexible and vibration-absorbable material, such as rubber, so that the friction or step feeling of the encoding switch 60 can be absorbed by the flexible transferring element 50 and is not directly transmitted the rotating disk 20. In other words, the transferring element 50 can provide amendatory compensation for tolerance, and the rotating characteristics of the rotating disk 20 will not be affected by the vibration and interval tolerance of the encoding switch 60. Therefore, the present disclosure utilizes the transferring element 50 to make the rotating disk 20 rotating more smoothly, and especially it can be applied in volume knob. Comparing with the prior art, the conventional knob is directly connected to the volume encoding switch, and the vibration condition is much and unstable during rotating.

A supplemental description is given for this instant embodiment. The bottom surface of the transferring element 50 is flat, and the purpose is to reduce the contacting area between the transferring element 50 and the encoding switch 60. The friction is reduced, and a smooth rotation is kept. However, the present disclosure is not limited thereto. Another comprehendible embodiment, the transferring element 50 can be fixedly disposed in the bottom center of the rotating disk 20, such as a wedging manner or screwing manner. The rotating rod 61 of the encoding switch 60 is fixed to the transferring element 50.

Please refer to FIG. 4 and FIG. 5. In this instant embodiment, the rotating knob module 1 further includes an upper rotating supporter 80 fixedly disposed between the top surface of the rotating disk 20 and the top wall 14 of the supporting frame 10. In detail, the upper rotating supporter 80 is fixed to a top surface of the sleeve portion 22. The upper rotating supporter 80 is preferably made of wear-proof material, and has a plurality of bumps 81 formed on the top surface of the upper rotating supporter 80 and contacted with the bottom surface of the top wall 14. The upper rotating supporter 80 has a plurality of fixing protrusions 82 formed on a bottom surface thereof, which are correspondingly inserted in positioning indentation 222 of the sleeve portion 22. The assembled cross-sectional view is shown in FIG. 7.

Please refer to FIG. 4 and FIG. 5. In this embodiment, the rotating knob module 1 further has a lower rotating supporter 70, which is passing through and fixed to the bottom wall 16 of the supporting frame 10. By the lower rotating supporter 70, the encoding switch 60 is fixed to the bottom wall 16. In detail, the lower rotating supporter 70 has a base board 72 fixed to the bottom wall 16 of the supporting frame 10 by screws 76, and an annular portion 74 upwardly protruded from the base board 72. The bottom wall 16 is formed with a bottom hole 160, and the annular portion 74 passes through the bottom hole 160. In this embodiment, the annular portion 74 of the lower rotating supporter 70 has a top surface not contacted the bottom surface of the rotating disk 20, so that the friction is reduced when the rotating disk 20 is rotating. However, in other kinds of designs, the top surface of the lower rotating supporter 70 is formed with a plurality of bumps 741 to assist the lower rotating supporter 70 in contacting the bottom of the rotating disk 20. The bumps 741 are formed on a top edge of the annular portion 74. The bumps 741 can selectively contact with the bottom surface of the rotating disk 20 to assist the lower rotating supporter 70 in supporting the rotating disk 20.

The detail of fixing the lower rotating supporter 70 to the encoding switch 60 is described as followed. The base board 72 is formed with a rod hole 740. The encoding switch 60 has a screwing cylinder-portion 65 disposed in a periphery of the rotating rod 61. The screwing cylinder-portion 65 passes through the rod hole 740 and is fixed to the base board 72 by a fixing nut 64.

Please refer to FIG. 4 and FIG. 7. Specifically, the supporting frame 10 of this embodiment preferably has a linking assembly 18 for linking two outer corners of the top wall 14 and the bottom wall 16. The linking assembly 18 and the front wall 12 are oppositely disposed at two sides of the rotating disk 20. The linking assembly 18 includes a supporting post 181, and a pair of screws 182 respectively passed through the top wall 14 and the bottom wall 16 to screwed two ends of the supporting post 181. The supporting post 181 can be metallic posts by lathe, having advantage of ensuring parallel accuracy of the supporting frame 10 after being bent in U-shaped. In other words, it can keep the rotating disk 20 being parallel with the top wall 14 and the bottom wall 16 during rotating. It therefore can avoid the rotating disk 20 happening to sway during rotating. The linking assembly 18 can revise the potential problems of structural assembly and manufacturing accuracy.

Figure 8:
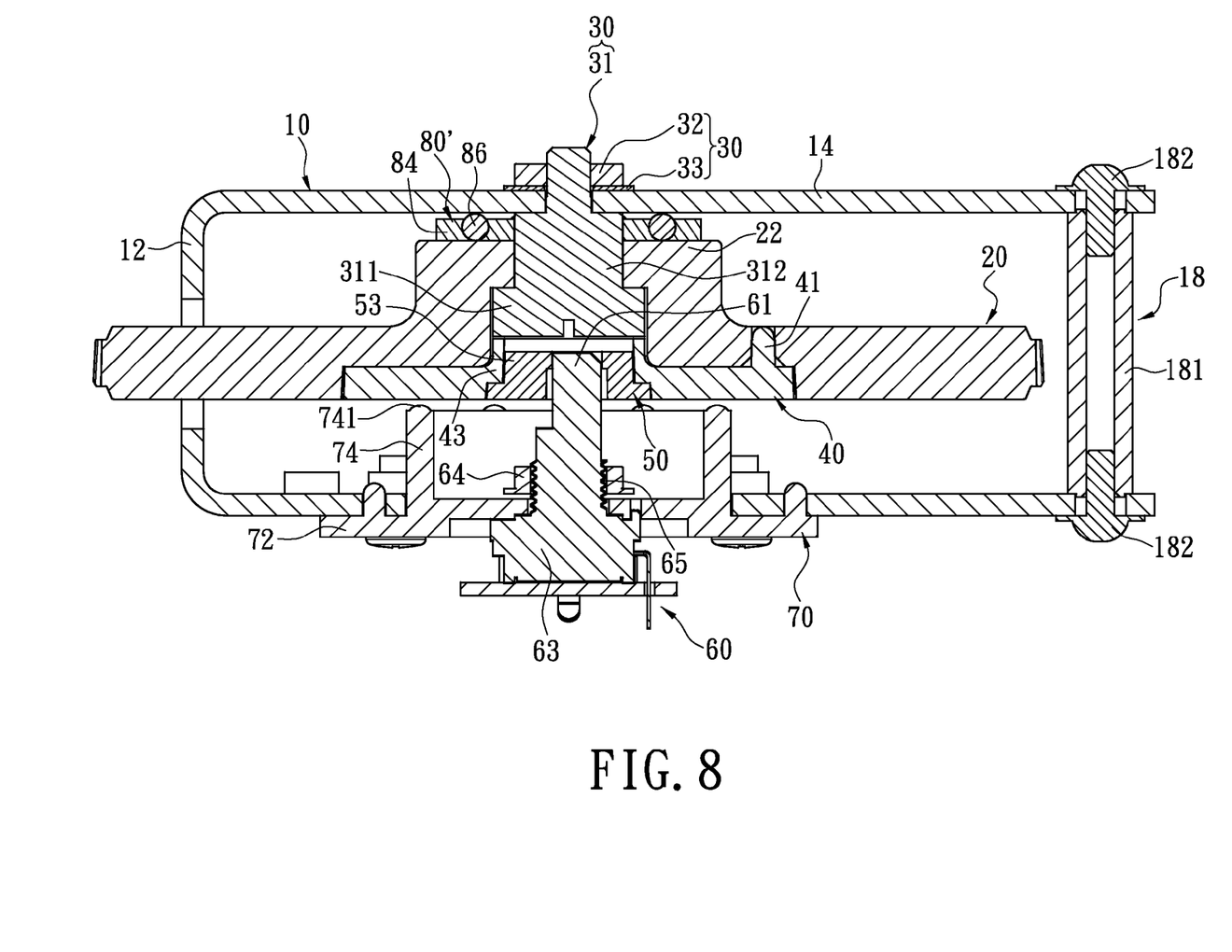
FIG. 8 is another assembled cross-sectional view of the stepless rotating knob module according to the present disclosure.

Please refer to FIG. 8, which shows a cross-sectional view of stepless rotating knob module of another embodiment according to the present disclosure. The different of this embodiment from the above embodiment is that the upper rotating supporter 80' is a ball bearing. The upper rotating supporter 80' has a bearing seat 84 and a plurality of rolling balls 86 received in the bearing seat 84. This embodiment uses the rolling balls 86 to contact with a top surface of the rotating disk 20 and the top wall 14 of the supporting frame 10.

Figure 9:
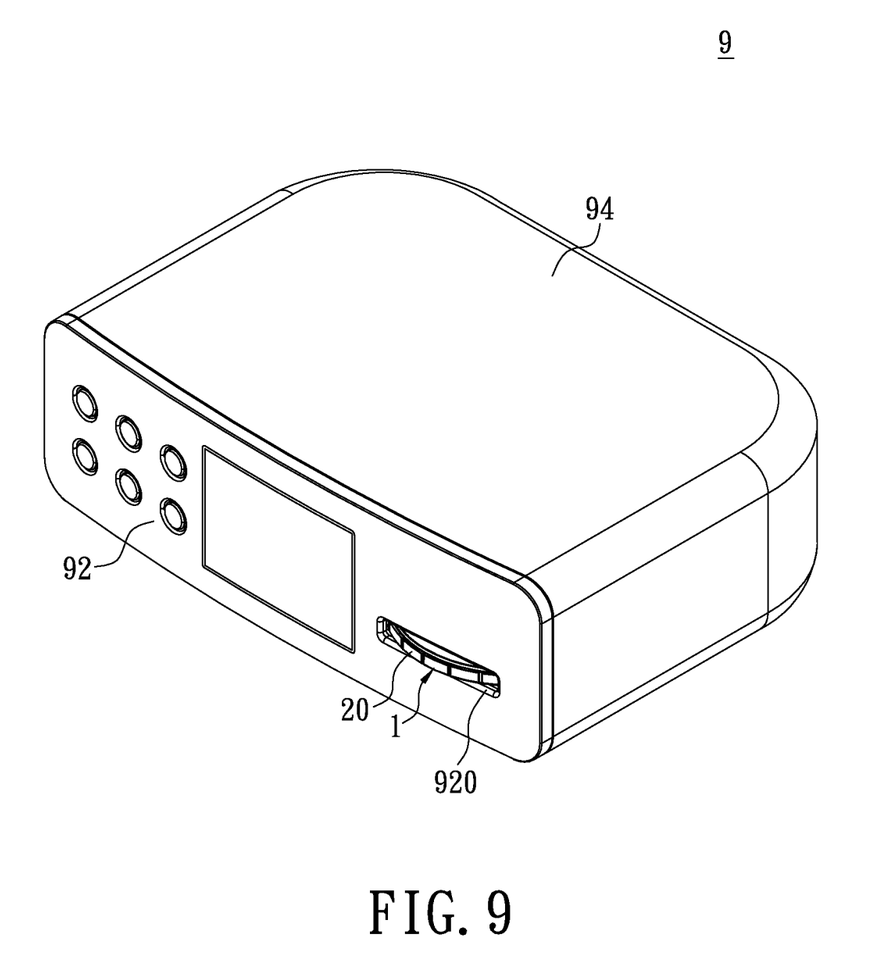
FIG. 9 is a perspective assembled view of electronic device having stepless rotating knob module according to the present disclosure.

Please refer to FIG. 9, which is a perspective assembled view of electronic device having stepless rotating knob module according to the present disclosure. Because the rotating knob module of this embodiment has a small height overall, which occupying a small space, so that the present disclosure is benefited to the slim-design of electronic device, as shown in FIG. 9. Besides, the position of the present disclosure can be changed according to the demand of industrial design.

In conclusion, this present disclosure has at least advantages and functions as followed.

As shown in FIG. 7, the present disclosure utilizes the suspending assembly 30 passing through the bottom surface of the rotating disk 20 and is fixed to the top wall 14. The rotating disk 20 is rotatably disposed on the suspending assembly 30 in a suspending manner. Besides, the upper rotating supporter 80 is fixed to the top surface of the sleeve portion 22, so that the friction force is reduced when the rotating disk 20 is rotating. Therefore, the rotating disk 20 can rotate smoothly in the supporting frame 10.

The suspending assembly 30 of the present disclosure has less elements and is assembled easily. Its thickness is low, so that the total height of the rotating knob module 1 can be reduced efficiently. In anther view, the inner space of electronic device 9 can be reduced. The present disclosure is advantageous to slim development of the electronic device, and the position can be altered according to the demands of appearance design.

The rotating disk 20 of this embodiment has a flexible transferring element 50 disposed on its bottom surface to connect with the encoding switch 60. The transferring element 50 can absorb any uneven rotation of the encoding switch 60. Therefore, the rotating disk 20 can be rotated more smoothly.

The linking assembly 18 is used to link outer ends of the top wall 14 and the bottom wall 16, which can keep the rotating disk 20 being parallel to the top wall 14 and the bottom wall 16 during rotating, to ensure the parallel accuracy of the supporting frame 10 after being bent in U-shaped.

Some modifications of these examples, as well as other possibilities will, on reading or having read this description, or having comprehended these examples, will occur to those skilled in the art. Such modifications and variations are comprehended within this invention as described here and claimed below. The description above illustrates only a relative few specific embodiments and examples of the invention. The invention, indeed, does include various modifications and variations made to the structures and operations described herein, which still fall within the scope of the invention as defined in the following claims.

What is claimed is:

1. A stepless rotating knob module, comprising:
    a supporting frame, having a front wall, a top wall, and a bottom wall, wherein the top wall and the bottom wall are respectively extending from a top edge and a bottom edge of the front wall, the front wall is formed with a front opening;
    a rotating disk, disposed between the top wall and the bottom wall of the supporting frame, and partially exposed outside the front opening;
    a suspending assembly, passing through the rotating disk from a bottom surface of the rotating disk, wherein the suspending assembly has a top end fixed to the top wall and a bottom end arranged above the bottom wall of the supporting frame, wherein the rotating disk is rotatably disposed on the bottom end of the suspending assembly, thereby the rotating disk is suspended from the top wall of the supporting frame;
    an encoding switch, fixedly connected to the bottom wall of the supporting frame, wherein the encoding switch has a rotary encoder for outputting an adjustment signal and a rotating rod extended toward the top wall; wherein the rotating rod is rotatable and substantially perpendicularly connected the rotary encoder;
    a transferring element, fixedly disposed on the center of the bottom surface of the rotating disk, made of vibration-absorbable material, wherein a top end of the rotating rod of the encoding switch is fixedly wedged in the transferring element; and
    a lower rotating supporter passing through and fixed to the bottom wall of the supporting frame, wherein the lower rotating supporter fixes the encoding switch to the bottom wall;
    wherein the lower rotating supporter includes a base board fixed to the bottom wall of the supporting frame, and an annular portion upwardly protruding from the base board; wherein the bottom wall of the supporting frame is formed with a bottom hole, the annular portion is passing through the bottom hole, wherein the lower rotating supporter has a plurality of bumps formed on a top surface thereof and contacting with the bottom surface of the rotating disk;
    wherein the base board is formed with a rod hole, the encoding switch has a screwing cylinder-portion disposed at a periphery of the rotating rod, the screwing cylinder-portion passes through the rod hole and fixed to the base board, wherein the bumps are formed on the top edge of the annular portion.

2. The stepless rotating knob module as claimed in claim 1, wherein the rotating disk has a disk body, a sleeve portion upwardly protruding from the center of the disk body, and a blocking groove, wherein an axial hole is formed through the sleeve portion, the blocking groove is communicated with the axial hole and the bottom of the rotating disk, and wherein the blocking groove has a diameter larger than that of the axial hole.

3. The stepless rotating knob module as claimed in claim 2, wherein the suspending assembly has a suspending screw and a screw nut disposed on the top wall, wherein the suspending screw has a head portion, a shaft portion and a screwing portion, wherein the head portion has a diameter larger than that of the shaft portion, and wherein the shaft portion is passing through the axial hole, the head portion is disposed in the blocking groove.

4. The stepless rotating knob module as claimed in claim 3, wherein the shaft portion is exposed outside a top surface of the rotating disk and contacting with a bottom surface of the top wall of the supporting frame, the shaft portion has a diameter larger than that of the screwing portion, the screwing portion is protruding outside the rotating disk and passes through the top wall to screw to the screw nut of the suspending assembly.

5. The stepless rotating knob module as claimed in claim 2, further comprising a holding piece, wherein the rotating disk further includes a bottom depression formed concavely from the bottom surface of the rotating disk and communicated with the blocking groove, wherein the holding piece is fixed in the bottom depression, and retaining the transferring element to the bottom surface of the rotating disk.

6. The stepless rotating knob module as claimed in claim 1, further comprising a linking assembly connected outer ends of the top wall and the bottom wall, wherein the linking assembly and the front wall are oppositely disposed at two sides of the rotating disk.

7. The stepless rotating knob module as claimed in claim 1, further comprising an upper rotating supporter disposed between the top surface of the rotating disk and the top wall.

8. The stepless rotating knob module as claimed in claim 7, wherein the upper rotating supporter is made of wear-proof material, and has a plurality of bumps formed on the top surface of the upper rotating supporter and contacting with the bottom surface of the top wall.

9. The stepless rotating knob module as claimed in claim 7, wherein the upper rotating supporter is a ball bearing.

10. The stepless rotating knob module as claimed in claim 1, wherein the transferring element has a bottom portion, and a matching portion extended from the bottom portion upward, the matching portion is formed with a matching hole, the matching hole has a contour matching with the rotating rod of the encoding switch.

11. An electronic device having stepless rotating knob module, comprising:
   an operating panel, formed with a panel opening; and
   a stepless rotating knob module, including:
      a supporting frame, fixed on an inner side of the operating panel, wherein the supporting frame has a front wall, a top wall, and a bottom wall, the top wall and the bottom wall extending from a top edge and a bottom edge of the front wall, the front wall being formed with a front opening;
      a rotating disk, disposed between the top wall and the bottom wall of the supporting frame, partially passing through the front opening of the supporting frame and the panel opening of the operating panel, and partially exposed outside the operating panel;
      a suspending assembly, passing through the rotating disk from a bottom surface of the rotating disk, wherein the suspending assembly has a top end fixed to the top wall and a bottom end arranged above the bottom wall of the supporting frame, wherein the rotating disk is rotatably mounted on the suspending assembly;
      an encoding switch, fixedly connected to the bottom wall of the supporting frame, wherein the encoding switch has a rotary encoder for outputting an adjustment signal and a rotating rod extended toward the top wall; wherein the rotating rod is rotatable and substantially perpendicularly connected the rotary encoder;
      a transferring element, fixedly disposed on the center of the bottom surface of the rotating disk, made of vibration-absorbable material, a top end of the rotating rod of the encoding switch being fixedly wedged in the transferring element; and
      a lower rotating supporter passing through and fixed to the bottom wall of the supporting frame, wherein the lower rotating supporter fixes the encoding switch to the bottom wall;
   wherein the lower rotating supporter includes a base board fixed to the bottom wall of the supporting frame, and an annular portion upwardly protruding from the base board; wherein the bottom wall of the supporting frame is formed with a bottom hole, the annular portion is passing through the bottom hole, wherein the lower rotating supporter has a plurality of bumps formed on a top surface thereof and contacting with the bottom surface of the rotating disk;
   wherein the base board is formed with a rod hole, the encoding switch has a screwing cylinder-portion disposed at a periphery of the rotating rod, the screwing cylinder-portion passes through the rod hole and fixed to the base board, wherein the bumps are formed on the top edge of the annular portion.

12. The electronic device as claimed in claim 11, wherein the operating panel has a suspending arm fixed at an inner side thereof and adjacent to the panel opening, and the bottom wall of the supporting frame is fixed to the suspending arm.

* * * * *